United States Patent [19]

Suzuki et al.

[11] Patent Number: 5,402,194
[45] Date of Patent: Mar. 28, 1995

[54] FILM MAGAZINE AND CAMERA

[75] Inventors: Tatsuya Suzuki; Kunio Yokoyama, both of Tokyo, Japan

[73] Assignee: Olympus Optical Co., Ltd., Tokyo, Japan

[21] Appl. No.: 125,680

[22] Filed: Sep. 22, 1993

[30] Foreign Application Priority Data

Sep. 22, 1992 [JP] Japan .................. 4-066053 U

[51] Int. Cl.⁶ ............................................. G03B 17/02
[52] U.S. Cl. .................................................... 354/288
[58] Field of Search ............ 354/145.1, 149.1, 149.11, 354/288; 242/71.1

[56] References Cited

U.S. PATENT DOCUMENTS

| | | | |
|---|---|---|---|
| 4,058,823 | 11/1977 | Mitchell et al. | 354/354 |
| 4,833,495 | 5/1989 | Ohmura et al. | 354/212 |
| 4,973,998 | 11/1990 | Gates | 354/145.1 |
| 4,992,810 | 2/1991 | Schappler | 354/149.11 |
| 5,001,505 | 3/1991 | Tosaka et al. | 354/173.1 |
| 5,146,255 | 9/1992 | Nakai et al. | 354/288 |
| 5,223,871 | 6/1993 | Iwasaki et al. | 354/75 |

*Primary Examiner*—Michael L. Gellner
*Assistant Examiner*—Nicholas F. Tuccillo
*Attorney, Agent, or Firm*—Louis Weinstein

[57] ABSTRACT

The present invention relates to a film magazine having an external cylinder both end surfaces of which are closed by upper and lower covers, and a spool hub rotatably contained in the external cylinder at the axis thereof. The spool hub has a thin winding shaft cylinder having and axial length substantially the same as the axial length of the external cylinder and a projection provided on an upper portion of the inner periphery thereof so as to engage a rewind mechanism of a camera. The winding shaft cylinder has a hollow space longitudinally extending over the interior length thereof. A strobe capacitor as a constituent part of the camera body is disposed in the space so that the space in the camera can be further decreased.

5 Claims, 4 Drawing Sheets

FILM MAGAZINE AND CAMERA

BACKGROUND OF THE INVENTION

1. Field of the Invention

The present invention relates to a film magazine and a camera, and more particularly to a film magazine having a spool hub for winding a film thereon and a camera which uses the film magazine.

2. Related Art Statement

As generally known, a film magazine which is generally used, for example, a film magazine in which a photographic film having a width of 35 mm is contained to form a roll, comprises an external metallic cylinder both ends of which are closed to form a light-shielding cylinder, and a spool hub rotatably contained in the cylinder at the axis thereof so as to wind a film on the hub to form a roll. Such a film is known as JIS135 type film, and is defined by JIS Standards 7519-1982 "135 Type Film Magazine" or ISO Standards 1007 "Photography-135-size film and magazine-specification".

The above conventional film magazine is not designed so as to contain a member other than a film rewinding fork in the spool hub. Thus, it cannot be said that a camera comprising such a film magazine effectively employs the interior space.

OBJECTS AND SUMMARY OF THE INVENTION

A first object of the present invention is to provide a camera and a film magazine which can effectively use the interior space.

A second object of the present invention is to provide a film magazine which enables effective use of an interior space in a camera.

A third object of the present invention is to provide a film magazine having an interior space in a spool shaft, and a camera which uses the film magazine for effectively using such interior space.

A fourth object of the present invention is to provide a camera and a film magazine which can effectively use an interior space by disposing constituent means of a camera body.

A fifth object of the present invention is to provide a camera and a film magazine which can effectively use an interior space by disposing a constituent member of an electric circuit of a camera body.

A sixth object of the present invention is to provide a camera and a film magazine which can effectively use an interior space by disposing a capacitor of a camera body.

A seventh object of the present invention is to provide a camera which facilitates loading of a film magazine having a hollow cylindrical portion in the spool shaft.

An eighth object of the present invention is to provide a film magazine having a space in a spool shaft, and a camera which uses the film magazine for effectively using such space and which can drive the spool shaft of the film magazine.

A ninth object of the present invention is to provide a camera system which can more effectively use an interior space.

In brief, the present invention provides a film magazine with a spool shaft having a hollow cylindrical portion which is rotatably provided for winding a film thereon, and a camera having constituent means which can be inserted into the cylindrical portion of the film magazine without affecting the spool shaft thereof.

These as well as other objects and advantages of the present invention will become further apparent from the following detailed explanation.

DETAILED DESCRIPTION OF THE PREFERRED EMBODIMENTS

Embodiments of the present invention are described below with reference to the drawings.

Figure 1:
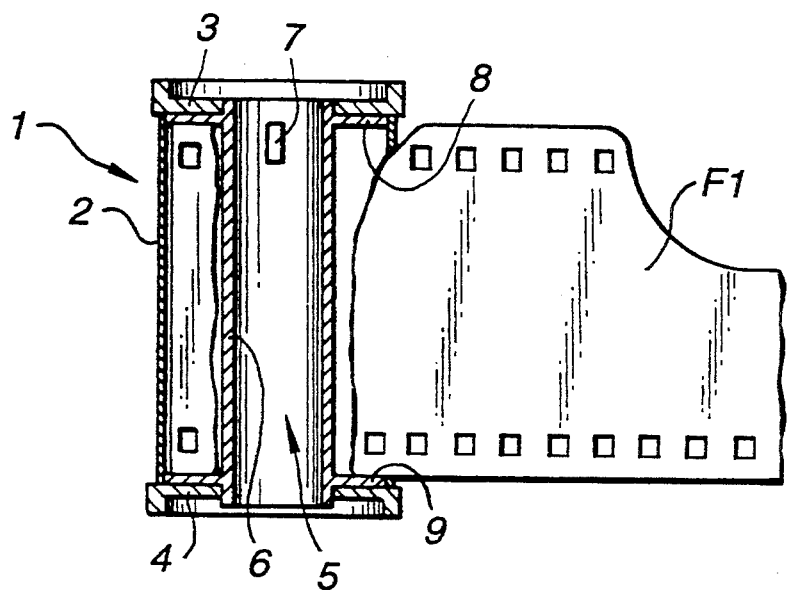
FIG. 1 is a sectional view of a film magazine in accordance with a first embodiment of the present invention.

FIG. 1 shows a film magazine in accordance with a first embodiment of the present invention.

A principal portion of a film magazine 1 comprises an external metallic cylinder 2, both ends of which are covered with an upper cover 3 and a lower cover 4 to form a light-shielding cylinder, and a spool hub 5 rotatably contained in the cylinder 2 at the axis thereof so that a film F1 is wound thereon to form a roll.

The spool hub 5 has a thin winding shaft cylinder 6 having substantially the same axial length as that of the external cylinder 2, and a rectangular projection 7 which is longitudinally slightly long and which is provided on an upper portion of the internal periphery of the winding shaft cylinder 6 so as to engage a rewinding mechanism of a camera. Horizontal flanges 8 and 9 are outwardly formed in portions near the upper and lower ends, respectively, of the winding shaft cylinder 6. The outer diameter of each of the flanges 8 and 9 is substantially equal to the inner diameter of the external cylinder 2.

The upper and lower covers 3 and 4 are engaged with the upper and lower portions of the external cylinder 2 containing the spool hub 5 so as to contact the flanges 8 and 9, respectively, to form the film magazine 1.

The film F1 is loaded in the space provided between the external cylinder 2 and the winding shaft cylinder 6 in the film magazine 1 configured as described above so as to be wound on the winding shaft cylinder 6. The winding shaft cylinder 6 has a space longitudinally extending over the interior.

Figure 2:
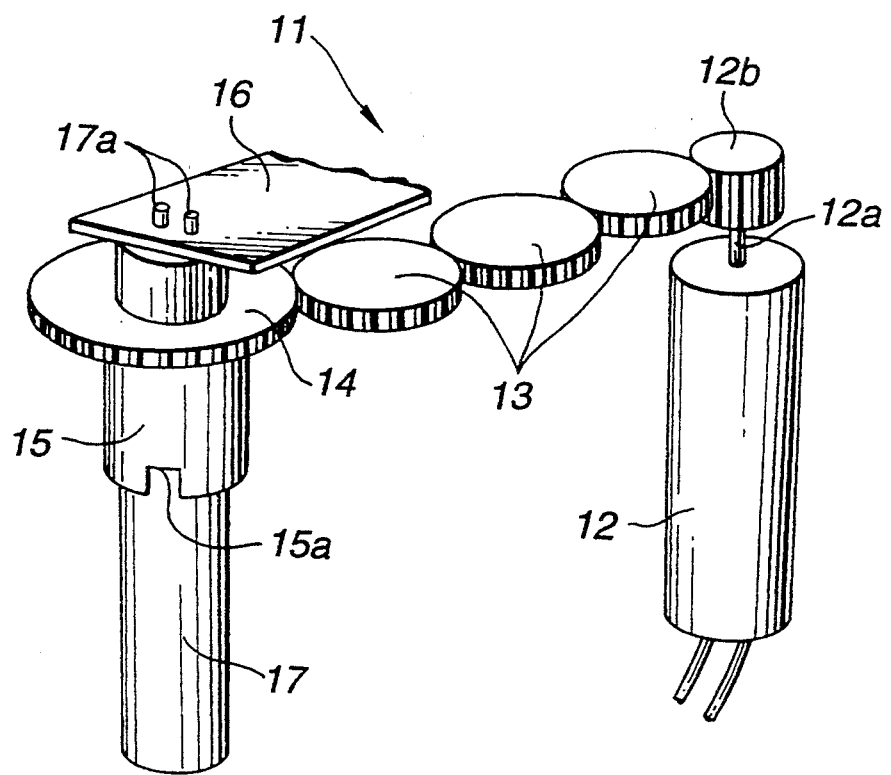
FIG. 2 is an enlarged perspective view of a film rewinding mechanism of a camera in accordance with the first embodiment.

FIG. 2 is a perspective view illustrating a portion near a rewinding mechanism of a camera that uses the film magazine 1.

A rewind mechanism 11 of a camera has a rewind motor 12. The torque of the rewind motor 12 is transmitted to a rewind gear 14 through a pinion gear 12b mounted at the tip of an output shaft 12a upwardly projecting from the rewind motor 12, a connecting gear array 13 comprising a plurality of gears and engaged with the pinion gear 12b.

The rewind gear 14 has a cylindrical portion 15 as a projecting member having substantially the same outer diameter as the diameter of the inner periphery of the winding shaft cylinder 6 and integrally provided on the lower side of the rewind gear 14. At the lower end of the cylindrical portion 15 is upwardly formed a rectangular engagement notch 15a which engages with the projection 7 of the film magazine 1. A strobe capacitor 17 as a constituent part of the camera body is disposed along the axis of the rewind gear 14 and is connected to an electrical substrate 16 arranged above the rewind gear 14 through an electric contact 17a.

The strobe capacitor 17 is connected to the electrical substrate 16 as described above, and thus it is not rotated, unlike the rewind gear 14.

The operation of the first embodiment is substantially the same as that of a conventional film magazine except the method of loading the film magazine in the camera. In photographing, the spool hub 5 of the magazine 1 is rotated by pulling out the film F1 to support discharge of the film F1. On the other hand, when the film F1 is rewound, the rewind gear 14 is rotated by the driving force of the rewind motor 12 through the connecting gear array 13, and the spool hub 5 is rotated by engagement between the engagement notch 15a and the projection 7 of the spool hub 5 to wind the film F1.

Figure 3:
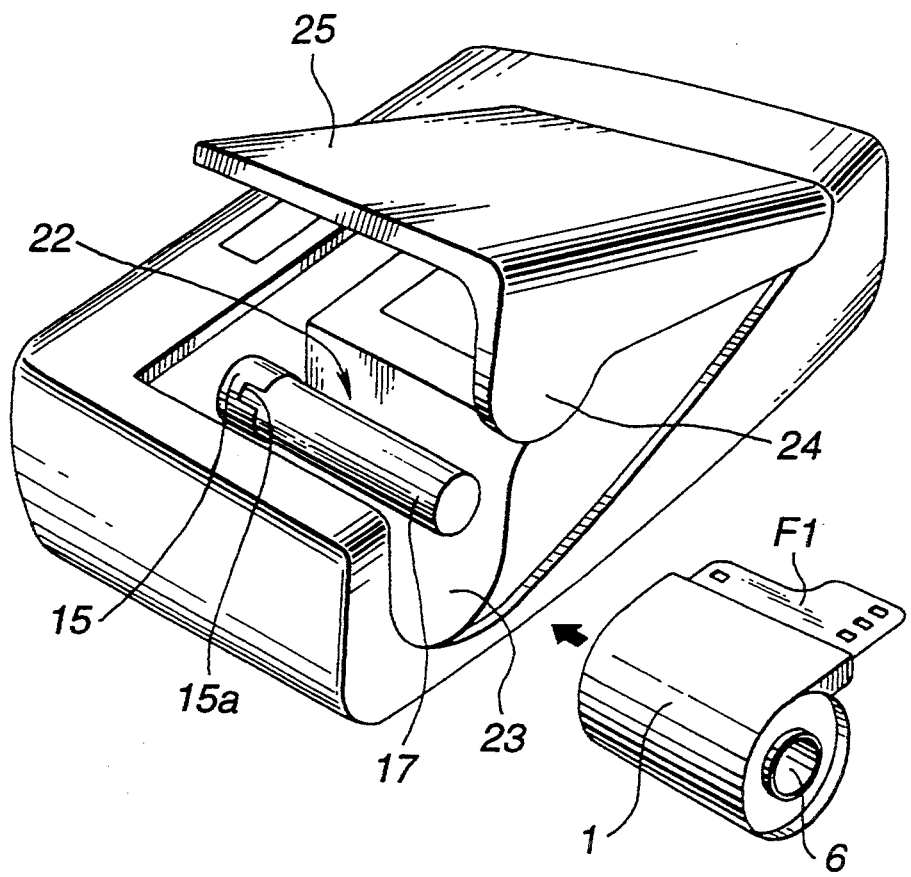
FIG. 3 is a perspective view of the film magazine and the camera in accordance with the first embodiment as viewed from the rear side in a state where a back cover is open.

The method of loading the film magazine in the camera, which is a different point from the conventional film magazine, is described below with reference to FIG. 3.

A U-shaped opening 23 is formed at the lower end of a magazine room or chamber 22 of the camera body, and a U-shaped projection 24 corresponding to the opening 23 is forwardly projected from the lower left portion of a back cover 25 of the camera. The strobe capacitor 17 is downwardly projected from the cylindrical portion 15 of the rewind mechanism, as described above.

In such a camera, the magazine 1 is upwardly loaded from the lower side thereof so that the capacitor 17 is inserted into the winding shaft cylinder 6 (for example, drop-in lowering or the like).

When the film magazine 1 is loaded in the camera, and when the back cover 25 is closed, no external light enters the inside of the camera from the U-shaped opening 23.

Figure 4:
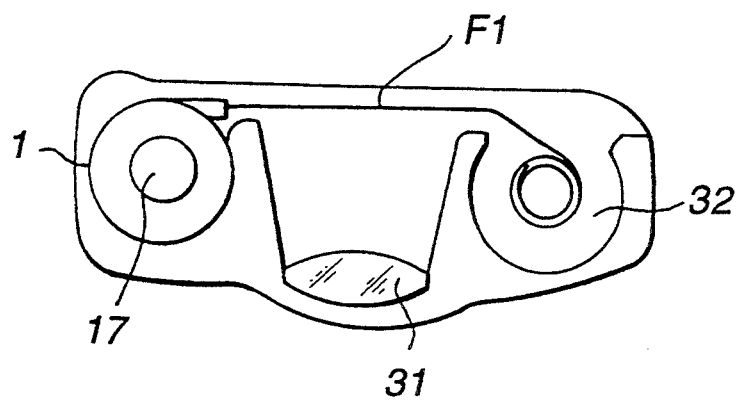
FIG. 4 is a drawing illustrating a layout example of a camera using the film magazine in accordance with the first embodiment.

FIG. 4 shows a layout example of the interior of the camera as viewed from the bottom side thereof.

In the camera, a photographic optical system 31 is disposed at the front substantially at the center of the camera so that the film magazine 1 is loaded on the left of the photographic optical axis. On the other hand, a spool room 32 is provided on the right of the photographic optical axis so that the film F1, which was pulled out of the magazine 1 and subjected to photography, is wound. In the arrangement of the layout example, the strobe capacitor 17 is disposed in the space provided in the axial portion of the spool hub 5 of the magazine 1.

This arrangement achieves a miniaturization of a camera.

Figure 7:
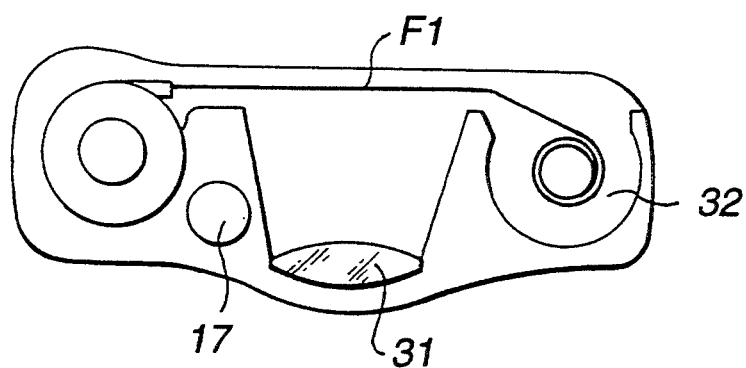
FIG. 7 is a drawing illustrating a layout example of a camera using a conventional film magazine.

Namely, in the layout of a camera which uses a conventional film magazine, for example, a space is provided in a portion between the photographic optical axis and the film magazine so that the strobe capacitor 17 is disposed in the space, as shown in FIG. 7, thereby making it difficult to miniaturize the camera. However, the use of the film magazine of the first embodiment permits the effective use of the space in the film magazine 1 and thus arrangement of the strobe capacitor 17 therein, thereby forming a camera with a small space.

A member to be disposed in the space provided in the spool hub 5 of the film magazine 1 should not be limited to the strobe capacitor 17, and, of course, a member which can decrease the space of the camera can appropriately be disposed.

The first embodiment can thus provide a film magazine having a space in the spool hub, and a camera which permits the space to be decreased by effectively use the space in the spool hub of the magazine.

Figure 5:
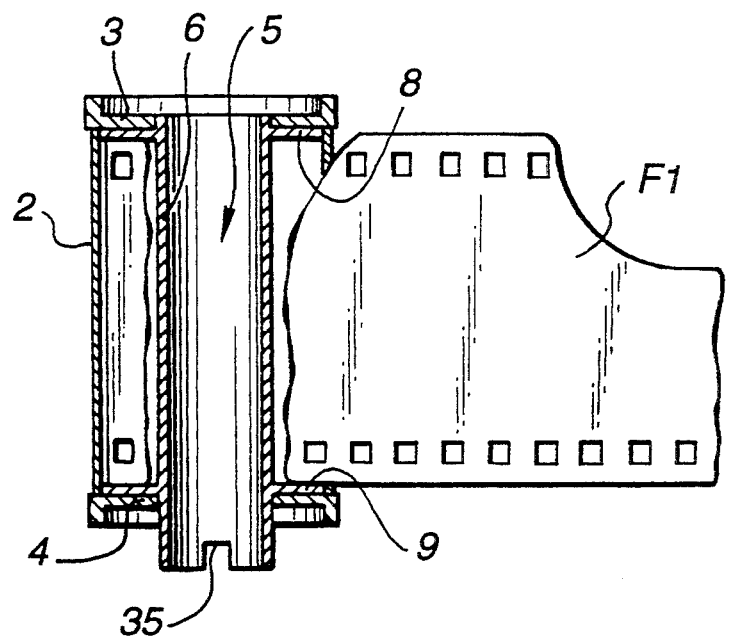
FIG. 5 is a sectional view of a film magazine in accordance with a second embodiment of the present invention.

FIG. 5 shows a film magazine in accordance with a second embodiment of the present invention. Since the arrangement of the second embodiment is substantially the same as that of the first embodiment, members having the same functions are respectively denoted by the same reference numerals, and are not described below. Only different points are described below.

The winding shaft cylinder 6 is further downwardly projected from the lower cover 4, and a rectangular engagement notch 35 is upwardly provided at the projecting lower end of the cylinder 6 so as to engage with the rewind mechanism possessed by the camera.

The operation and effects of the second embodiment configured as described above are substantially the same as those of the first embodiment.

Figure 6:
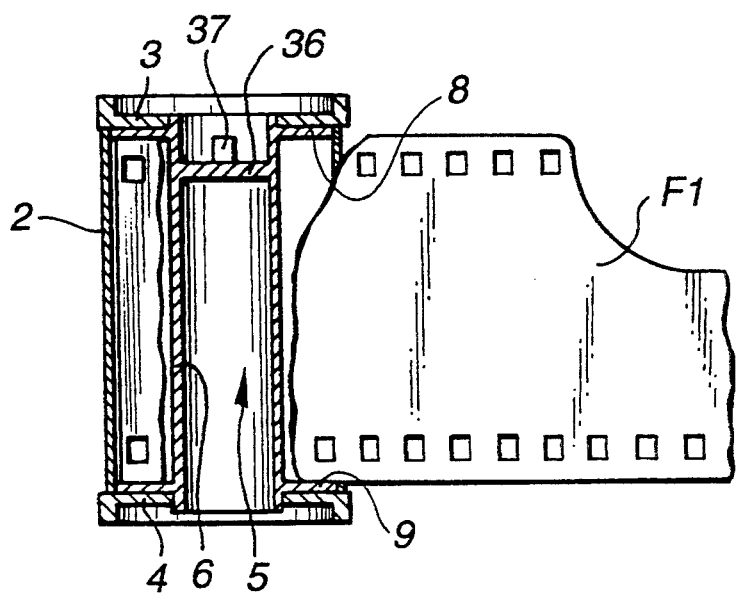
FIG. 6 is a sectional view of a film magazine in accordance with a third embodiment of the present invention.

FIG. 6 shows a film magazine in accordance with a third embodiment of the present invention. Since the arrangement of the third embodiment is substantially the same as that of the first embodiment, members having the same functions are respectively denoted by the same reference numerals, and are not described below. Only different points are described below.

A disk member 36 is integrally provided in the upper portion of the internal periphery of the winding shaft cylinder 6 so as to partition the interior of the cylinder 6 into two portions. A projection 37 is provided on the upper end surface of the disk member 36 along the internal periphery of the winding shaft cylinder 6 so as to engage with the rewind mechanism of the camera. Namely, since the disk member 36 is provided in the third embodiment, the interior of the winding shaft cylinder 6 does not longitudinally extend over the cylinder 6, unlike the first and second embodiments.

Although the operation and effects of the third embodiment configured as described above are substantially the same as those of the first embodiment, the third embodiment is different from the first embodiment only in the point that only the space below the disk member in the winding shaft cylinder 6 can effectively used by disposing a member in a camera.

In this invention, it is apparent that working modes different in a wide range can be formed on this basis of this invention without departing from the spirit and scope of the invention. This invention is not restricted by any specific embodiment except being limited by the appended claims.

What is claimed is:

1. A camera comprising:
    a film magazine chamber for releasably containing a film magazine removably inserted into said chamber and having a projection which is inserted into a hollow portion of a spool shaft of the film magazine without affecting rotating operation of the spool shaft by a winding member, the spool shaft of the film magazine being rotatably Contained in the film magazine so as to wind a film thereon and having a cylindrical portion with a hollow interior;

said projection including a constituent part of an electric circuit in a camera body, said constituent part of the electric circuit being a capacitor.

2. A camera according to claim 1 wherein said electric circuit includes a substrate arranged adjacent to one end of said film magazine chamber, said capacitor having terminals joined to said substrate.

3. A camera according to claim 2 wherein a rotatable drive member is arranged at one end of said magazine chamber for engaging and rotating said spool shaft; and said capacitor extending through an opening in said driving member which is of a size sufficient to permit rotation of the driving member without interference by said capacitor.

4. A camera comprising:

a film magazine chamber for containing a releasably insertable film magazine;

said film magazine having a spool shaft; and a stationary constituent part projecting from one wall of the film magazine chamber and aligned with an axial direction of the spool shaft to be received by and contained in a hollow cylindrical portion provided in the spool shaft of the film magazine without affecting operation of the spool shaft by a winding member; and said constituent part being a strobe capacitor.

5. A camera system comprising:

a camera body;

a film magazine for releasable insertion into the camera body:

a film magazine chamber provided in the camera body for receiving the film magazine;

a spool shaft rotatably provided in the film magazine for winding a film thereon;

a hollow cylindrical portion provided in the spool shaft;

a constituent part projecting from one wall of the film magazine room to be received by and contained in the hollow cylindrical portion without affecting operation of the spool shaft by a winding member; and said constituent part being a strobe capacitor.

* * * * *